US009531579B2

United States Patent
Willig et al.

(10) Patent No.: US 9,531,579 B2
(45) Date of Patent: Dec. 27, 2016

(54) SESSION CONTROL FOR MEDIA STREAM TRANSMISSION

(75) Inventors: Johannes Willig, Herzogenrath (DE); Daniel Catrein, Würselen (DE); Frank Hartung, Herzogenrath (DE); Markus Kampmann, Andernach (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/811,334

(22) PCT Filed: Aug. 10, 2010

(86) PCT No.: PCT/EP2010/004879
§ 371 (c)(1),
(2), (4) Date: Mar. 20, 2013

(87) PCT Pub. No.: WO2012/019621
PCT Pub. Date: Feb. 16, 2012

(65) Prior Publication Data
US 2013/0212166 A1 Aug. 15, 2013

(51) Int. Cl.
*G06F 15/16* (2006.01)
*H04L 29/06* (2006.01)
*H04L 29/08* (2006.01)

(52) U.S. Cl.
CPC ... *H04L 29/06027* (2013.01); *H04L 29/06047* (2013.01); *H04L 65/105* (2013.01);
(Continued)

(58) Field of Classification Search
CPC .............................. H04L 65/4084; H04L 65/80
(Continued)

(56) References Cited

U.S. PATENT DOCUMENTS 7,007,062 B1  2/2006 Serenyi et al.
7,653,685 B2  1/2010 Serenyi et al.
(Continued)

FOREIGN PATENT DOCUMENTS

EP    1193920 A2    3/2002
EP    2383941 A1    11/2011
(Continued)

OTHER PUBLICATIONS

3rd Generation Partnership Project, "Technical Specification Group Services and System Aspects; Transparent end-to-end Packet-switched Streaming Service (PSS); Protocols and Codecs (Release 9)", Technical Specification, 3GPP TS 26.234 V9.3.0, Jun. 14, 2010, pp. 1-182, 3GPP Organizational Partners, Valbonne, France.
(Continued)

*Primary Examiner* — Wing F Chan
*Assistant Examiner* — Joseph Maniwang
(74) *Attorney, Agent, or Firm* — Coats & Bennett, PLLC

(57) ABSTRACT

A method for controlling the transmission of a media stream comprising a plurality of consecutive stream elements Is described. The method comprises the step of obtaining (32) a media description of the media stream, the media description indicating an initial element of the stream elements. A request for the initial stream element is sent (34) and a session control procedure is initiated (36) for a session. The media stream is associated (38) with the session in the session control procedure. The transmission of a subsequent element of the stream elements is controlled in accordance with a control rule of the session. Devices and further methods embodying the invention are also described.

29 Claims, 11 Drawing Sheets

(52) U.S. Cl.
CPC ...... *H04L 65/1006* (2013.01); *H04L 65/1016* (2013.01); *H04L 65/1046* (2013.01); *H04L 65/1059* (2013.01); *H04L 65/1063* (2013.01); *H04L 65/1069* (2013.01); *H04L 65/4084* (2013.01); *H04L 65/4092* (2013.01); *H04L 65/80* (2013.01); *H04L 67/2823* (2013.01); *H04L 67/42* (2013.01)

(58) Field of Classification Search
USPC .......................................... 709/223–229, 231
See application file for complete search history.

(56) References Cited

U.S. PATENT DOCUMENTS

| | | | |
|---|---|---|---|
| 2003/0050052 A1 | 3/2003 | Minborg et al. | |
| 2004/0064573 A1 | 4/2004 | Leaning et al. | |
| 2006/0291452 A1 | 12/2006 | Velagaleti et al. | |
| 2008/0256254 A1 | 10/2008 | Kim et al. | |
| 2009/0286516 A1* | 11/2009 | Sedlacek et al. | 455/414.1 |
| 2010/0138545 A1 | 6/2010 | Mela et al. | |
| 2011/0219134 A1* | 9/2011 | Lidstrom et al. | 709/229 |
| 2011/0307581 A1* | 12/2011 | Furbeck et al. | 709/219 |
| 2012/0011270 A1* | 1/2012 | Priddle et al. | 709/231 |
| 2012/0144056 A1* | 6/2012 | Stokking et al. | 709/231 |
| 2012/0185530 A1* | 7/2012 | Reza | 709/203 |

FOREIGN PATENT DOCUMENTS

| | | |
|---|---|---|
| JP | 2002152274 A | 5/2002 |
| JP | 2005-012655 A | 1/2005 |
| JP | 2007-194680 A | 8/2007 |
| JP | 2009-225217 A | 10/2009 |
| RU | 2273103 C2 | 3/2004 |
| RU | 2367003 C2 | 9/2009 |
| WO | 0199374 A2 | 12/2001 |
| WO | 2009029202 A2 | 5/2009 |
| WO | 2010078281 A2 | 7/2010 |
| WO | 2010088030 A2 | 8/2010 |

OTHER PUBLICATIONS

3rd Generation Partnership Project, "3rd Generation Partnership Project; Technical Specification Group Services and System Aspects Transparent end-to-end Packet-Switched Streaming Service (PSS); HTTP-Based Streaming and Download (HSD) (Release 10)", #GPP TS 26.cde V0.0.3, Jun. 23, 2010, pp. 1-34, 3GPP Organizational Partners, Valbonne, France.

3rd Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 9)", 3GPP TS 26.237 V9.3.0, Jun. 9, 2010, pp. 1-99, 3GPP Organizational Partners, Valbonne, France.

Pantos, R., "HTTP Live Streaming draft-pantos-http-live-streaming-01", IETF Informational Internet-draft, Jun. 8, 2009, pp. 1-18, [Retrieved on Jan. 16, 2013], Retrieved from Internet: http://tools.ietf.org/html/draft-pantos-http-live-streaming-01.

Telefon AB LM Ericsson, ST-Ericsson SA, "Media Presentation Description in HTTP Streaming," 3GPPSA4#57, CPEL1350210P, Tdoc S4-100080, St. Julian, Malta, Jan. 25-29, 2010.

* cited by examiner

SESSION CONTROL FOR MEDIA STREAM TRANSMISSION

TECHNICAL FIELD

The present invention relates to a method for controlling the transmission of a media stream. Devices and software programs embodying the invention are also described.

BACKGROUND

An important application of transmission networks like the Internet or mobile telephone networks is the media delivery from a server to a client. Media may be for example audio and video.

Media delivery in IP (Internet Protocol) based networks may use different transport protocols. Traditionally, either RTP (Real-time Transport Protocol) over UDP (User Datagram Protocol) is used for real-time streaming and packet-based streaming or HTTP (Hyper Text Transfer Protocol) over TCP (Transmission Control Protocol) for download of whole files, mostly for later consumption but also for life streaming. RTP allows for dynamic adaptation to available bit-rate as measured by the client. A drawback of RTP and the associated control protocol RTSP (Real-time Streaming Protocol) is the need for specialized and more complicated server software, while HTTP can use widely deployed and inexpensive HTTP server software. A recent development, Adaptive HTTP Streaming (AHS), aims at combining the advantages of both approaches. AHS is standardized in 3GPP (Third Generation Partnership Project), and also adopted and slightly extended in the Open IPTV Forum (OIPF). MPEG (Moving Pictures Experts Group) is also working on AHS.

In AHS, the content is encoded in different versions, usually corresponding to different bit rates. If the content is for example a video with a video track and an audio track, the video track could be encoded in three versions with different bit rate each, and the audio track in a high-quality stereo and a mono version. Each version is further divided into segments of a few seconds duration. For example, the video versions can be divided into many consecutive segments of 10 seconds duration each. The segments may be formatted according to the MPEG-4 file format, or according to the MPEG-2 transport stream format.

The actual transmission of the video and audio tracks is performed by downloading one segment after the other initiated by the client. In this procedure the client downloads a segment using a standard HTTP request, unpacks, decodes, and renders it, and then does the same for the next segment etc. The client has knowledge about the available quality versions, and about the segment separation over time by means of a media description, the so-called Media Presentation Description (MPD). The MPD format as defined in 3GPP and OIPF is an XML (eXtensible Markup Language) encoded file containing appropriate information and attributes to describe the media. The MPD is the first resource transmitted to a client in order to start an AHS based media delivery. The MPD as it is specified by 3GPP comprises the different available qualities and information how they are arranged into segments.

Each segment is downloaded at the maximum available speed under the present operation conditions of the network used for transmission and the client monitors the download speed it experiences. Based on the experienced download speed the client selects the most appropriate of the available quality versions. From segment to segment this may be a different version, and the client can download different qualities depending on the present operation conditions, hence the attribute "adaptive" HTTP streaming. FIG. 1 visualizes the principle and shows different media representations for adaptive HTTP streaming of a content item as a function of the playout time. The three representations in FIG. 1 may correspond to a high, medium and low bitrate representation, respectively, of a content item, i.e. stream. Begin and end of the playout time for the stream segments of different representations coincide so that smooth switching between the representations is possible. The vertical scale in FIG. 1 illustrates the data size of the different stream representations, e.g. their bit rate. Depending on the client implementation, enhanced selection procedures are possible for switching between the representations, e.g. including a hysteresis in order to avoid excessive quality fluctuations when viewing or listening to a stream.

Another trend in multimedia communication is the usage of the IP Multimedia Subsystem (IMS) for the initiation and control of multimedia sessions. Within 3GPP, standardized solutions for IMS controlled RTP streaming as well as for IMS controlled HTTP progressive download are defined in 3GPP TS 26.237 V9.3.0 (2010 June) with the title IP Multimedia Subsystem (IMS) based Packet Switch Streaming (PSS) and Multimedia Broadcast/Multicast Service (MBMS) User Service; Protocols. These solutions benefit from the standardized features offered by IMS like charging, authentication or QoS (Quality of Service) reservation.

FIG. 2 shows the different signaling steps in case of IMS controlled HTTP progressive download as defined in 3GPP TS 26.237. The session is initiated with a SIP (Session Initiation Protocol) INVITE message which includes SDP (Session Description Protocol) information. The HTTP URL (Uniform Resource Locator) for download is delivered to the user equipment (UE), i.e. client, via the SIP 200 OK message. In addition, a QoS reservation for the HTTP progressive download session may be carried out. The progressive download itself is initiated by the UE with a HTTP GET command towards the HTTP server, which in return responds with the requested content file. In more detail, the following steps are performed:

1. The UE initiates the progressive download session by sending SIP INVITE to the IM CN subsystem, including an SDP offer.
2. The IM CN subsystem forwards the SIP INVITE message to the SCF.
3. The SCF verifies the user rights for the requested content, selects an HTTP/SIP adapter, and forwards the SIP INVITE message to the HTTP/SIP adapter.
4. The HTTP/SIP adapter selects an HTTP Server, and sends an HTTP POST message to the HTTP server, including the IP address of the UE.
5. The HTTP server answers to the HTTP/SIP adapter with a HTTP 200 OK response.
6. The HTTP/SIP adapter sends the SIP 200 OK answer to the SCF, including download URL of the requested content file in the SDP answer.
7. The SCF forwards the SIP 200 OK to the IM CN subsystem.
8. The IM CN subsystem forwards the SIP 200 OK to the UE.
9. The UE sends an HTTP request to the URL obtained from the SIP 200 OK message.
10. The HTTP server delivers the content file in the HTTP response to the UE.

The current AHS concept as specified e.g. in 3GPP TS 26.234 Transparent end-to-end Packet-switched Streaming Service (PSS), Open IPTV Forum—Release 2 Specification, HTTP Adaptive Streaming, DRAFT V0.06—Jun. 7, 2010 or in proprietary solutions like Microsoft Smoothstreaming or Apple streaming (see R. Pantos, HTTP Live Streaming, http://tools.ietf.org/html/draft-pantos-http-live-streaming-01) specify only the media packaging, media description and download mechanisms. No connection is foreseen to combine the mechanism with resource or QoS reservation mechanisms. Thus, even in managed systems where QoS reservation and control is possible, AHS works with best effort and will in general therefore still require adaptation.

SUMMARY

It is an object of the present invention to provide an improved method for controlling the transmission of a media stream and corresponding devices.

The proposed method relates to a media stream comprising a plurality of consecutive stream elements. In the method, a media description of the media stream is obtained. The media description indicates an initial element of the stream elements. A request for the initial stream element is sent. A session control procedure for a session is also initiated. In the session control procedure, the media stream is associated with the session. The transmission of a subsequent element of the stream elements is controlled in accordance with a control rule of the session.

A method for controlling the transmission of a media stream comprising a plurality of consecutive stream elements can also be performed in a media client. The method in the client comprises the step of obtaining a media description of the media stream. The media description indicates an initial element of the stream elements. The media client sends a request for the initial stream element. The media client initiates also a session control procedure for the transmission of the media stream.

A media client according to the invention comprises a controller coupled to a sender and a receiver. The controller is adapted for controlling the transmission of a media stream to the receiver. The media stream comprises a plurality of consecutive stream elements. The controller is further adapted to obtain a media description of the media stream. The media description indicates an initial element of the stream elements. The controller is also adapted to initiate sending of a request for the initial stream element by the sender and to initiate a session control procedure for the transmission of the media stream.

An advantageous media server has a controller for controlling the transmission of a media stream comprising a plurality of consecutive stream elements in response to requests for the stream elements from a client. The media server comprises also a sender adapted to send the stream elements. The media server comprises furthermore a receiver for receiving a request for an initial element of the stream elements, the request indicating the initial element. The receiver is also adapted to receive a result of a session control procedure for the transmission of the media stream, and to receive a further request for a subsequent element of the stream elements. The controller is coupled to the sender and to the receiver and adapted to control the sending of the subsequent element based on the result of the session control procedure.

A method in a media server controls the transmission of a media stream comprising a plurality of consecutive stream elements in response to requests for the stream elements from a client. The method comprises the step of receiving a request for an initial element of the stream elements. The request indicates the initial element. The indicated initial element is sent. In a further step a result is received of a session control procedure for the transmission of the media stream. Upon receiving a further request for a subsequent element of the stream elements the sending of the subsequent stream element is controlled based on the result of the session control procedure.

An advantageous control entity is suitable for performing a session control procedure with a media client for the transmission of a media stream comprising a plurality of consecutive stream elements from a media server. The control entity comprises a receiver for receiving signaling of a session control procedure for the transmission of the media stream. A controller is adapted for terminating the signaling and coupled to the receiver. The controller is also adapted to associate the media stream with the session in the session control procedure. The controller is coupled to a sender for an instruction initiating control of the transmission of a subsequent element of the stream elements in accordance with a control rule of the session.

A method in a control entity is performed for a session control procedure with a media client for the transmission of a media stream comprising a plurality of consecutive stream elements from a media server. The method comprises the step of receiving signaling of a session control procedure for the transmission of the media stream. The signaling is terminated and the media stream is associated with the session in the session control procedure. An instruction is sent for initiating control of the transmission of a subsequent element of the stream elements in accordance with a control rule of the session.

A media proxy is suitable for forwarding media descriptions from a server to a client. The media proxy comprises a receiver for receiving, from the server, a media description comprising a plurality of representation descriptions. Each representation description indicates a different representation of the media stream. A processor is adapted to modify the media description by removing or modifying at least one of the representation descriptions and a media source of the at least one representation description from the media description. A sender is adapted for sending the modified media description towards the client.

A method in a media proxy for forwarding a media description from a server to a client comprises the steps of receiving the media description from the server. The media description comprises a plurality of representation descriptions, each representation description indicating a different representation of the media stream. The media description is modified by removing or modifying at least one of the representation descriptions and a media source of the at least one representation description from the media description. The modified media description is sent towards the client.

The above methods may also be implemented as programs which can, for example, be stored on a data carrier or loadable into a processing system or memory of the devices described, e.g. as a sequence of signals.

The foregoing and other objects, features and advantages of the present invention will become more apparent in the following detailed description of embodiments as illustrated in the accompanying drawings.

DETAILED DESCRIPTION

Figure 1:
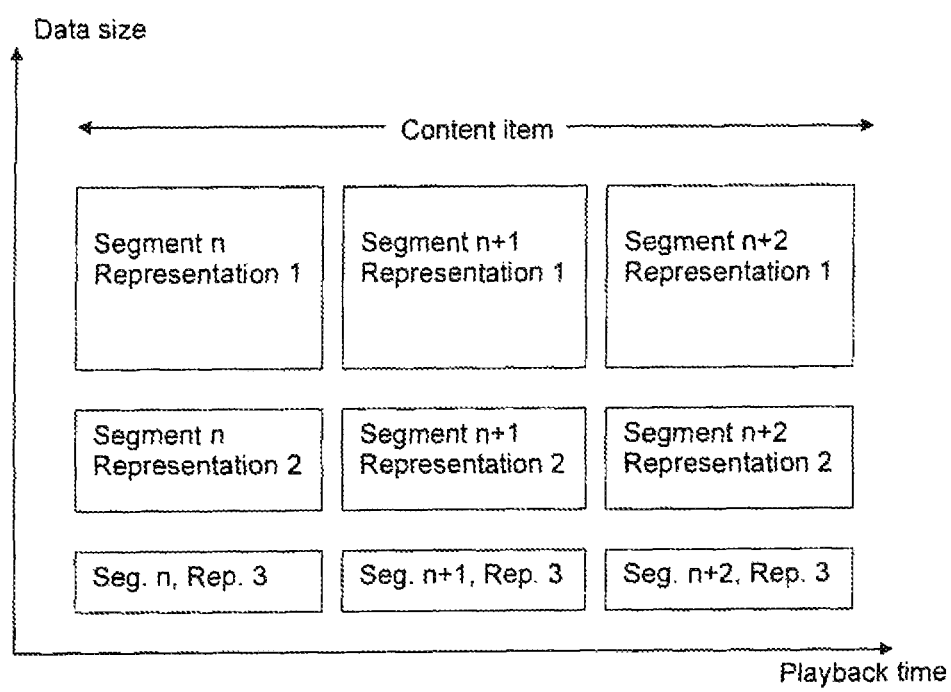
FIG. 1 illustrates media representations of a media stream.
Figure 2:
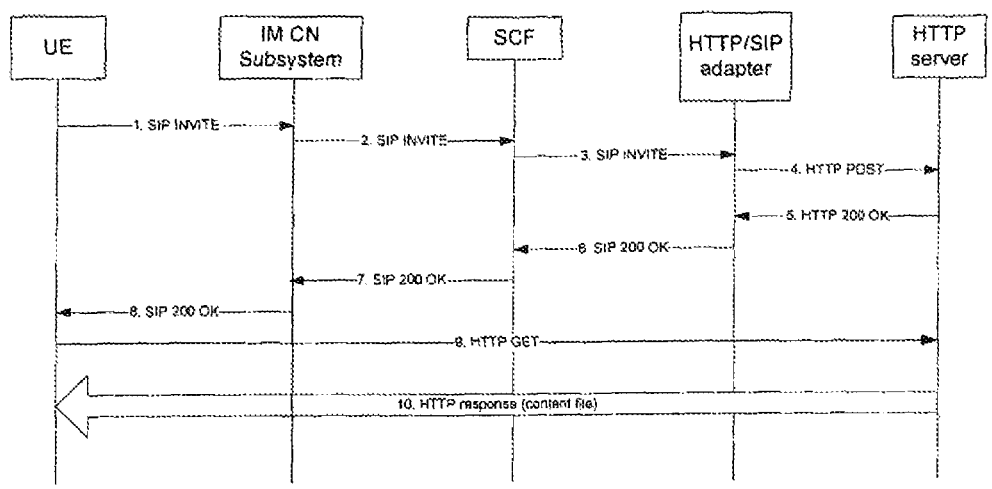
FIG. 2 shows a signaling diagram of an IMS controlled HTTP download.
Figure 3:
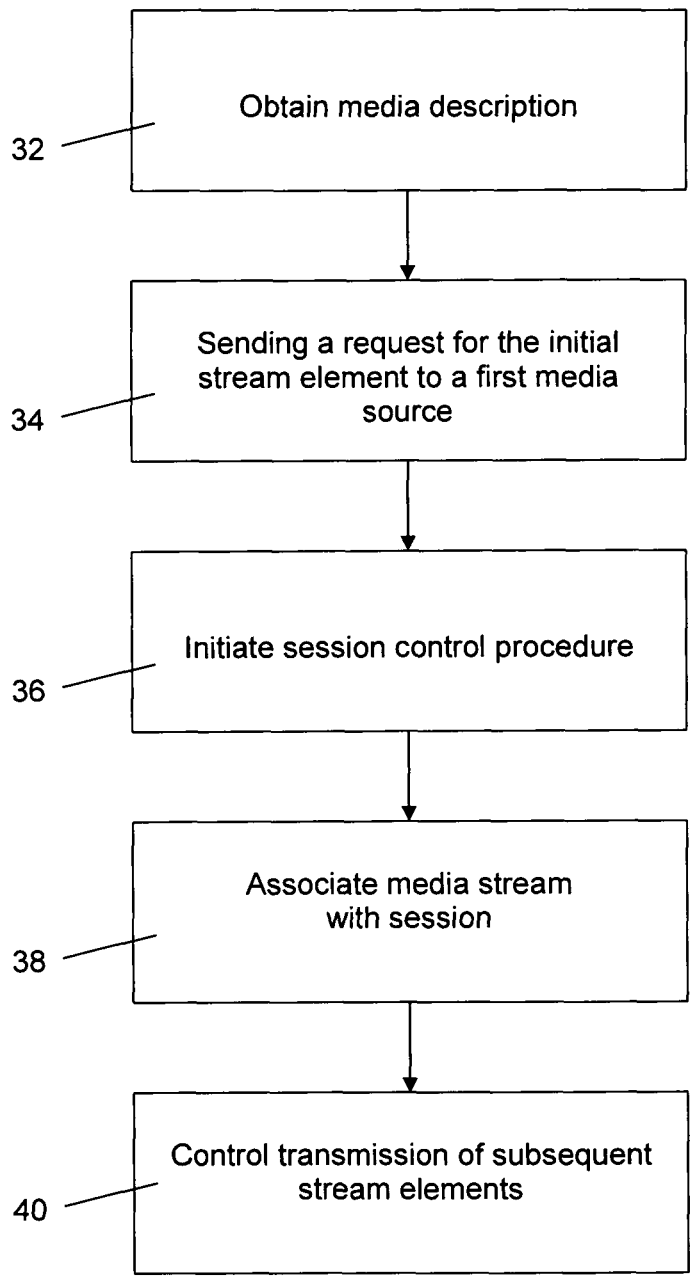
FIG. 3 shows a flow chart of the proposed method.

The present method relates to controlling the transmission of a media stream comprising a plurality of consecutive stream elements. A first embodiment of the method is illustrated in FIG. 3. The stream elements may be for example stream segments as they are used e.g. in HTTP streaming. Segments may be available in different qualities, e.g. with different media resolution. The stream may relate for example to a video track or an audio transmission and different streams may be associated with each other, e.g. a video track with an audio track. The stream can be transmitted to a client which may be any user equipment adapted to render the stream to a user, for example a personal computer or a mobile phone.

In the method a media description of the media stream is obtained 32, e.g. from a file downloaded by the client. The media description indicates an initial element of the stream elements, e.g. as a media source like a URI from which the initial element is available. In general, media sources may also be indicated by a template for generating URIs to elements by the client in order to avoid that the source for each element of a stream needs to be individually transmitted, e.g. by providing a rule to generate the source of the $n^{th}$ element of a stream as a function of n. In the terminology of the present text, the media source indicates the specific origin of a stream element, in contrast to the platform hosting (e.g. storing or generating) and providing the stream element, e.g. a server or a network. Accordingly, the request may be addressed, e.g. with an IP address and port number, to the platform and include the media source, e.g. in the form of an HTTP GET message included in the request.

The media file may also comprise one or more descriptions of different representations of the stream, e.g. an indication of different image resolutions of a video. Optionally, a plurality of media sources is indicated for the initial element, e.g. if the stream is available in different qualities or from different servers and the client can select one of them. A request for the initial stream element is sent 34, for example by the client, to the platform to obtain the initial element from the media source.

A session control procedure for the transmission of the media stream is also initiated 36, for example by the client or the network. A session is a transmission context between the client and a network performing the transmission with specified transmission properties which may for example be enforced by a policy control element of the network. In wireless networks a session is typically associated with a radio access bearer transporting the session. The session control procedure may be any procedure associating 38 the media stream with a session, e.g. a session establishment for the stream or a modification of an existing session in which the media stream is associated with the session. The association specifies the session in which the stream is transmitted.

The session control procedure may be initiated before, at the same time or after sending the request. In embodiments it is advantageous if the initiation of the session control procedure and the request are done essentially simultaneously or shortly after each other. Accordingly, the media streaming can be initiated before the session control procedure is finished.

The transmission of a subsequent element of the stream elements, i.e. a stream element sent after full or partial conclusion of the session control procedure can then be controlled 40 in accordance with a control rule of the session. The subsequent element is not necessarily immediately succeeding to the initial element and it is possible that one or more elements exist between both, e.g. depending on the time for execution of the session control procedure and the presentation time of the stream elements. Typically the control is performed for any subsequent stream element. The at least one control rule may define for example a particular quality of service for the session, e.g. a bit rate, the initiation of a billing procedure or the blocking of a session, e.g. if the user is lacking a corresponding subscription or account balance. The control may also comprise a monitoring or an integration of the stream handling with other services, e.g. a push service to provide background information to a stream or an ordering service, e.g. for allowing to buy the soundtrack of a streamed movie. The control according to the control rule may be performed by a policy enforcement point, e.g. at a gateway, transmitting the stream wherein the stream elements can be identified for example based on address information in the elements, e.g. in a packet header of the elements.

In an embodiment, the session control procedure comprises the step of obtaining a resource locator indicating a source for session control associated with the media stream. This allows sending a request to a corresponding platform for initiating the session control procedure with the source for session control. The resource locator may be included in the media description or associated with the media description, e.g. transmitted in the same message as the media description. In this case both are simultaneously available.

Optionally, the media description comprises or is associated with at least one information element specifying a session parameter in the session control procedure. For example the media description or individual representations in the media description may indicate a bandwidth required to transmit the stream or stream representation. The parameter can then be specified, e.g. in an SDP file, as requirement for establishing or modifying the session with which the stream is to be associated.

The session control procedure may comprise the step of receiving a session control response for the session control procedure by a client, e.g. a SIP 200 OK message, in particular if the session control procedure is initiated by the client. The client may then send, upon reception of the session control response, a request for the subsequent element or elements of the stream, generally indicating a further media source. For example, after association of the stream with the session a higher stream quality may be requested, which is available from the further source. If the request for the subsequent element indicates a further media source this may also simplify identification of the stream elements for the purpose of policy control. A further media source may be hosted on the same or a different platform, e.g. server, as the initial source for the stream elements.

If the session control procedure comprises the step of receiving a session control response for the session control procedure by the client, the client may also send, upon reception of the session control response, the request for the initial element of the stream, i.e. the order of the steps differs from the embodiments discussed so far. In this case, the start of the streaming session may be delayed compared to other embodiments described but it can be ensured that an appropriate session exists from the beginning of the stream. This can avoid access to initial elements of a content which shall not be received without prior authorization. Accordingly, the steps of sending the request for the initial stream element is delayed in this embodiment until reception of the session control response and the step of controlling the transmission may not only relate to the subsequent elements but may also include the transmission of the initial element. In this case it is possible that the media description is only obtained by the client with the session control response for the session control procedure, e.g. a SIP 200 OK message, and the response may also comprise further information as discussed below. It is merely required that information identifying the media stream can be obtained in the session control procedure, e.g. provided by the client.

The session control response may indicate one or more parameters specifying the session. This may be for example a session identifier to allow handling or monitoring of the session. A parameter specifying the session may indicate also a granted quality of service if the session control procedure comprises a resource reservation. If a further media source for subsequent stream elements is selected from a plurality of media sources for the subsequent element, each media source from the plurality may be associated with a different parameter specifying the session. This allows for example a selection of different stream qualities or platforms for download based on the parameter in the control response.

The session control response may also comprise an indication of a media source, e.g. as a URI of the media source or as a template to generate a plurality of URIs. In this way, the control response may indicate e.g. a source for a media representation which was indicated in the media description without an associated source, for example if the use of the respective source is not authorized without prior session control procedure, e.g. to initiate a billing.

The session control response may also include a media description comprising, e.g., further representations of the media stream. If the included media description is updated from a version received earlier it is possible that the reception of the updated media description triggers a further session control procedure, like e.g. a QoS renegotiation in order to modify the session parameters to obtain the required session parameters for a high quality video, for example after a prior session control procedure allowed the access to the stream in general based on an initiated billing or check of the client subscription.

The parameter specifying the session may also be included into the request for the subsequent element. This allows for example a session identification to authenticate that the client is allowed to access the media from a further media source or to associate the session with messages from control entities for the session.

Both the further media source and the source for session control may be specific for the session, i.e. they may be associated with the session. For example the further media source may be generated in response to the session initiation and may comprise an arbitrary or pseudo arbitrary element so that it can not easily be guessed and provide access only for the session. Also an individual source for session control may be sent in a personalized message or media description. This can avoid unauthorized access and denial of service attacks. It is also possible that initial media sources are specific for the media description or, depending on the embodiment, the session.

In a further embodiment, the media description comprises a plurality of representation descriptions, each representation description indicating a different representation of the media stream and an associated media source. Both an initial and a further media source can then be selected based on the media description, e.g. to obtain different quality levels of a media stream. The selected media source can then be included into the request for the initial element or into the request for the subsequent element.

A client, e.g. a UE, may be adapted to perform a method for controlling the transmission of a media stream comprising a plurality of consecutive stream elements. According to the method the client obtains a media description of the media stream, for example by receiving it in a message in response to a request or in any other way. The media description indicates an initial element of the stream elements, e.g. as a media source like a URI from which the initial element may be requested. Accordingly the client sends a request for the initial stream element from the media source, e.g. to an associated platform. The client also initiates a session control procedure for the transmission of the media stream. The initial stream element can be requested without waiting for conclusion of the session control procedure, e.g. a session establishment or modification for a session to which the media stream can be associated. Correspondingly, an initial transmission, e.g. with best effort quality, can be quickly performed while waiting for the session establishment which can offer additional options of stream control and handling, e.g. a defined QoS. This can particularly enhance user experience when beginning the stream playout.

Figure 4:
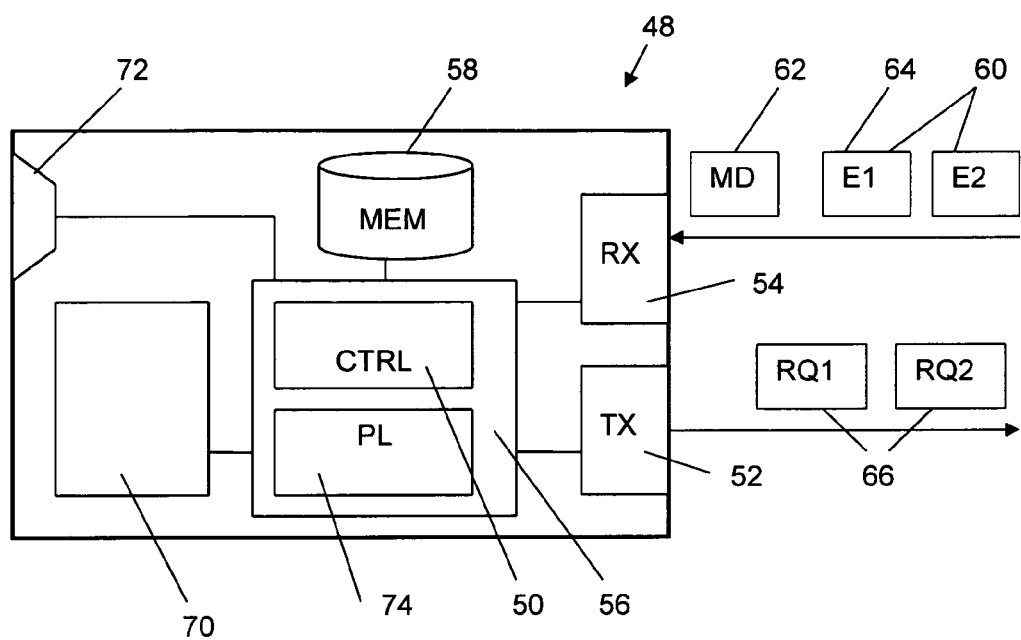
FIG. 4 shows a media client adapted to the proposed method.

A media client 48 adapted to perform aspects of the above methods is shown in FIG. 4. It comprises a controller 50 coupled to a sender 52 and a receiver 54.

Sender 52 and receiver 54 may be adapted to send and receive radio transmissions in a fixed or wireless communication system, e.g. as parts of a transceiver. Transmissions can be sent, e.g., as IP packets comprising HTTP requests and responses. The controller 50 may be implemented for example in a processing system 56 with a memory 58 which execute control routines implemented, e.g., by software programs.

The controller 50 is adapted for controlling the transmission of a media stream comprising a plurality of consecutive stream elements 60, and to obtain a media description 62 of the media stream. The transmission control can be performed by control messages initiated by the receiver, in particular by requests 66 for stream elements from media sources. The media description indicates an initial element 64 of the stream elements, e.g. as a media source. The controller 50 is further adapted to initiate sending of a request 66 for the initial stream element by the sender 52, e.g. to a platform hosting the media source, and to initiate a session control procedure for the transmission of the media stream.

The depicted media client comprises also hardware like a screen 70 or a loudspeaker 72 to render the received stream to a user. For this purpose the client comprises a playout logic 74 which may also be implemented in the processing system 56. The playout logic 74 receives the stream elements 60 from the receiver 54 and unpacks and decodes them for playout by the screen 70 or the loudspeaker 72. The controller 50 may also be adapted to request one or more further stream elements 60 when they are needed for playout, to select a representation of the media stream based on information in the media description 62 and a monitored data rate of received stream elements and to initiate requests 66 by the sender 52 for the respective representation. The monitoring of the data rate can be performed for example by detecting the sizes of stream elements and measuring the time for their transmission. In case of AHS, specific requests 66 correspond to specific stream elements 60 as indicated by the element labels in the figure.

Figure 5:
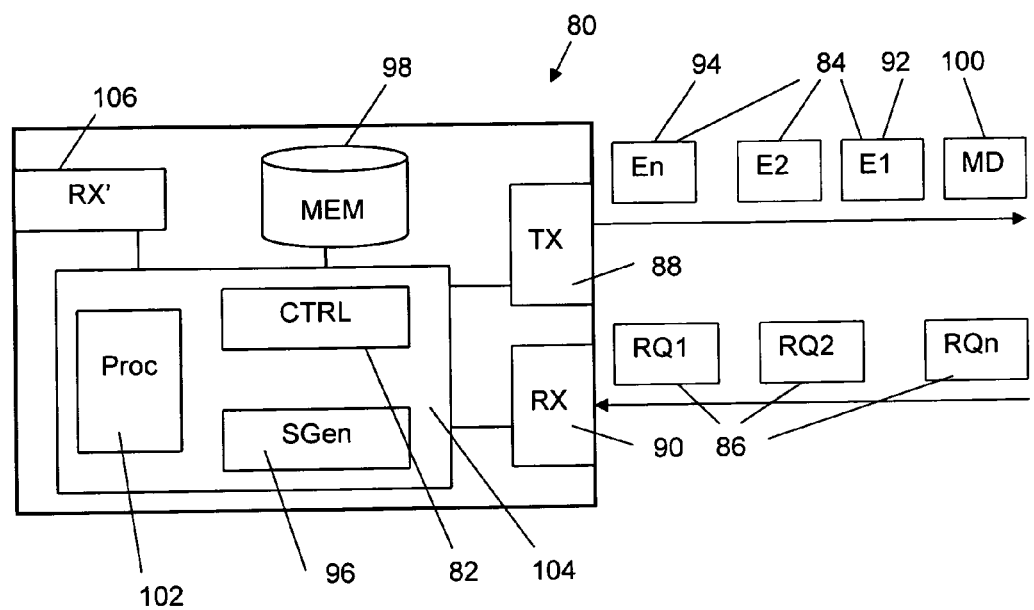
FIG. 5 shows a media server adapted to the proposed method.

A media server 80 adapted to perform aspects of the above methods is shown in FIG. 5. It comprises a controller 82 for controlling the transmission of a media stream comprising a plurality of consecutive stream elements 84 in response to requests 86 for the stream elements from a client, e.g. the client as described with respect to FIG. 4. The media server 80 comprises a sender 88 for sending the stream elements 84 towards the client and a receiver 90. Sender and receiver may be adapted for radio or wire line transmission. Receiver 90 is adapted to receive a request 86 for an initial element 92 of the stream elements, which request 86 indicates the initial element 92, e.g. as a media source like a URI. The receiver 90 is also adapted to receive a result of a session control procedure for the transmission of the media stream, for example from a control entity of a network transmitting the media stream and to forward it to controller 82.

Receiver 90 is still further adapted to receive a further request for a subsequent element 94 of the stream elements. The further request may comprise a further media source of the subsequent element. In case of AHS, specific requests 86 correspond to specific stream elements 84 as indicated by the element labels in the figure.

The controller 82 is coupled to the sender 88 and to the receiver 90 and is adapted to control the sending of the subsequent stream element 94 based on the result of a successful session control procedure. For example the sending may be performed if a confirmation of the session control procedure is received and the sending may be blocked if no confirmation is obtained. It is also possible that the controller 82 allows or blocks access to specific representations of a stream element, e.g. to a segment of a high-resolution video, based on the result or returns a different, e.g. a lower-quality representation than requested. A plurality of further options is conceivable.

Media server 80 typically comprises also a stream generator 96 which encodes the stream elements 84 for transmission, e.g. based on information stored in a memory 98 or based on received information, e.g. via a further receiver 106 or from higher protocol layers. It is possible that the media server is itself a user equipment, e.g. when streaming content recorded by a mobile phone camera or microphone.

In an embodiment of the media server 80, the sender 88 is adapted to send a media description 100 of the media stream to the client. Transmission of the media description 100 can also be initiated by a request from the client which is not shown in the figure. The media description 100 indicates a media source for the initial element 92 of the stream elements and optionally also a further media source of the subsequent stream element 94.

In this embodiment, a processor 102 may be adapted to obtain an initial media description, e.g. from memory 98, comprising a plurality of representation descriptions, each representation description indicating a different representation of the media stream, and optionally indications of associated media sources. Processor 102 may be further adapted to remove at least one of the representation descriptions from the initial media description in order to specify the media description 100 for transmission. The processor may also modify the representation description, e.g. to values which avoid selection by the client. If a source indication exists it can also be removed or modified, e.g. to replace a high quality source by a low quality source. Optionally, the processor may merely remove a media source while keeping the representation description so that the receiver is informed about the existence of the representation without getting the associated source. Similarly, instead of merely removing a representation description with associated source, a tag may be included instead of the removed representations, which indicates to the client that at least one further representation is available. In this way the server can generate a modified media description which may be used prior to the session control procedure. The processor 102 may be part of a processing system 104.

Figure 5A:
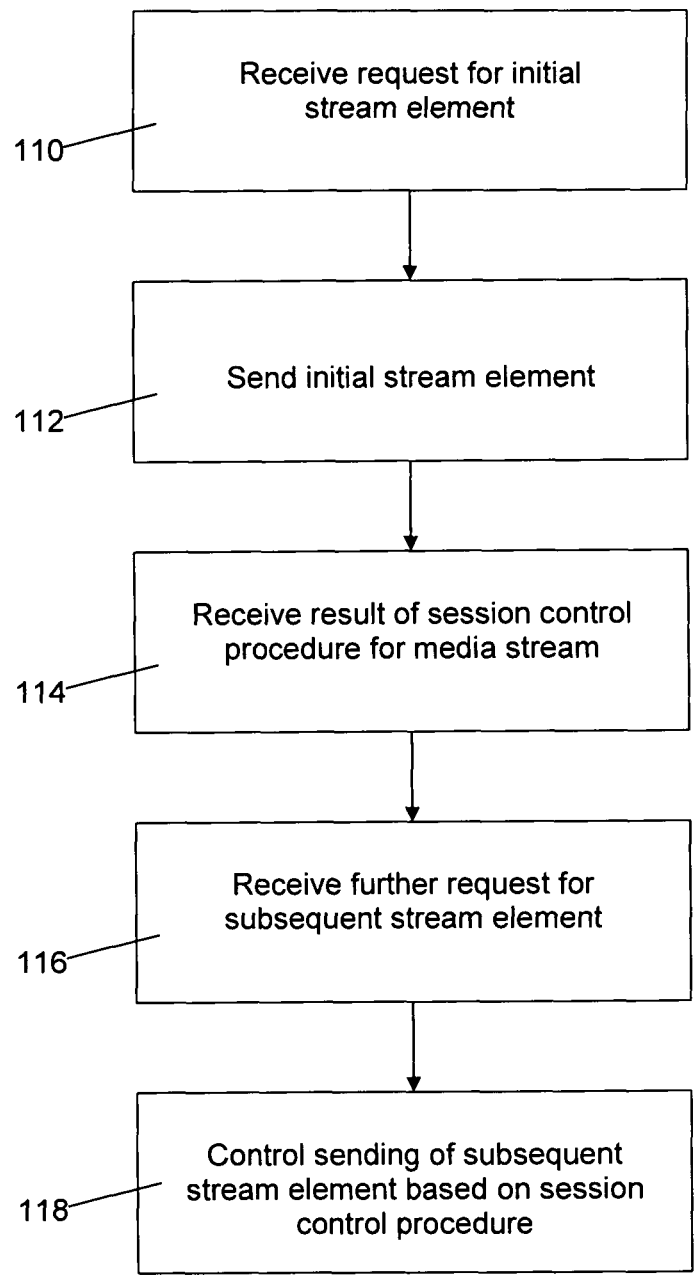
FIG. 5a shows a method executed in a media server.

FIG. 5a depicts a corresponding method in a media server controlling the transmission of a media stream comprising a plurality of consecutive stream elements in response to requests for the stream elements from a client. The method starts with the steps of receiving 110 a request for an initial element of the stream elements. The request indicates the initial element, e.g. as a media source identifying the stream element. In response to the request, the initial element is sent 112 towards the client. At any point in time during the method a result of a session control procedure for the transmission of the media stream is received 114 by the media server. When the media server receives 116 a further request for a subsequent element of the stream elements, it can control 118 the sending of the subsequent element based on the result of the session control procedure.

Figure 6:
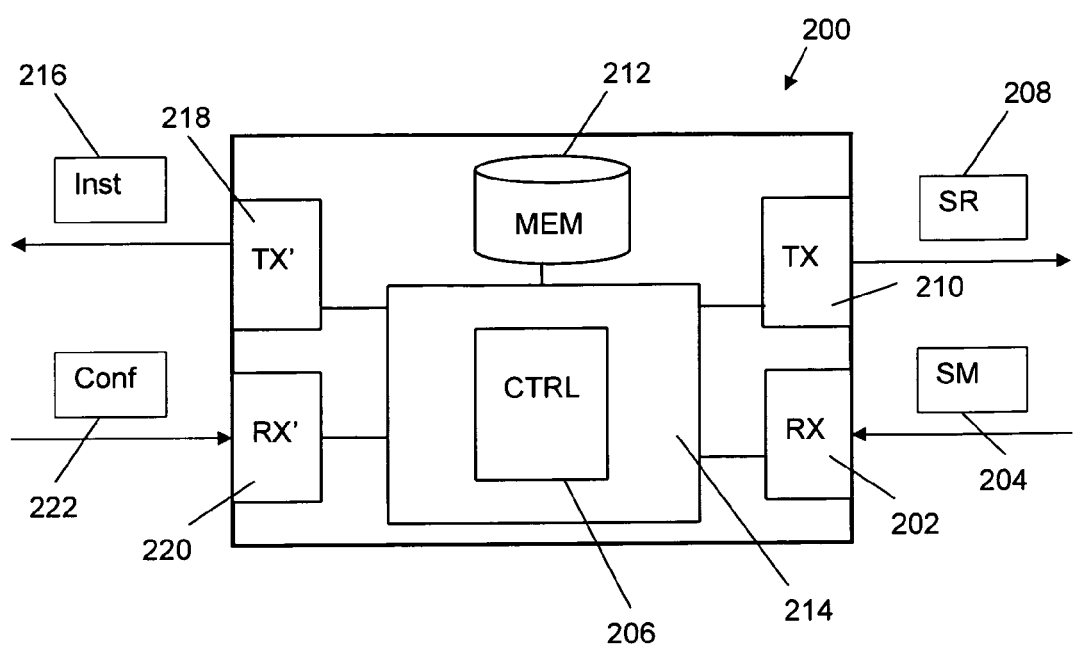
FIG. 6 shows a control entity adapted to the proposed method.
Figure 6A:
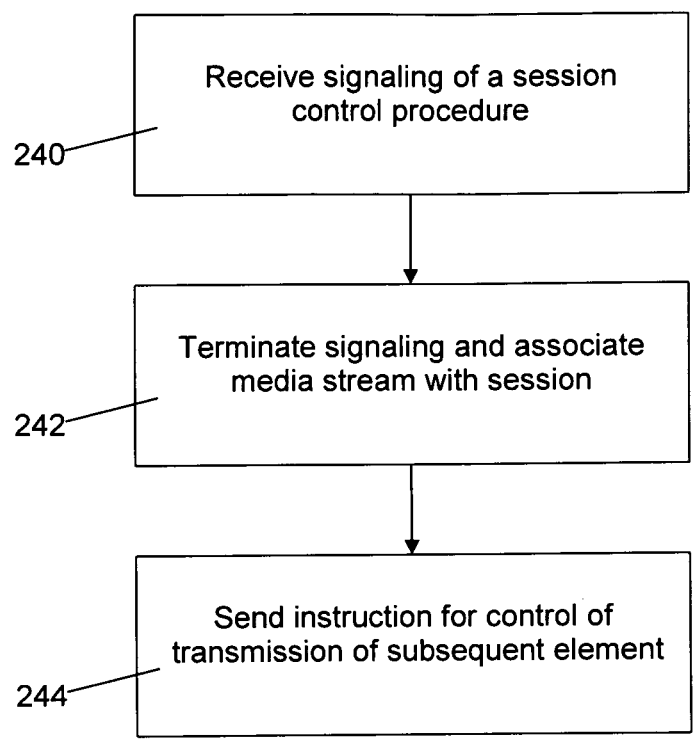
FIG. 6a shows a method executed in a control entity.

FIG. 6 shows a control entity 200 for controlling a session with a media client for the transmission of a media stream comprising a plurality of consecutive stream elements from a media server, e.g. a server as described above. The control entity may for example be implemented as an HTTP/SIP adapter. Control entity 200 comprises a receiver 202 for receiving signaling messages 204 of a session control procedure for the transmission of the media stream, for example SIP messages. The messages are e.g. initiated by a media client as described above and forwarded by further network elements which may also obtain session related information from the session control procedure and are thus capable to execute or initiate control operations related to the session.

A controller 206 terminates the signaling, i.e. it is an endpoint for the signaling. Accordingly, it processes the signaling messages 204 and may initiate the sending of responses 208 by a sender 210. For this purpose, the controller 206 is coupled to the receiver 202 and sender 210. Controller 206 is furthermore adapted to associate the media stream with the session in the session control procedure. For example, the controller 206 may select an existing session for transmitting the media stream and possibly modify session parameters for this purpose or the controller may establish a new session for the media stream. A memory 212 allows storing and retrieving information for the session. The controller may be implemented in a processing system 214 of the control entity 200.

Based on the result of the session control procedure, controller 206 initiates the sending of an instruction 216 by a sender 218. The instruction 216 initiates control of the transmission of a subsequent element of the stream elements in accordance with a control rule of the session and can be sent to a media server transmitting the media stream or to a policy enforcement point of the session. A receiver 220 corresponding to sender 218 allows receiving e.g. a confirmation 222 for the instruction 216. The control entity may also obtain information via receiver 220 which may be sent to the client or used in defining session parameters, e.g. a media description or media sources. Sender 218 and receiver 220 may be identical to sender 210 and receiver 202 or may be different entities and they may also use a different protocol, e.g. HTTP, possibly depending on the recipients. Sender 218 and receiver 220 may also correspond to an internal interface of a device if the instruction is sent to an entity implemented on the same platform.

A method in a control entity for performing a session control procedure with a media client for the transmission of a media stream comprising a plurality of consecutive stream elements from a media server starts with the step of receiving 240 signaling of a session control procedure for the transmission of the media stream. The control entity terminates 242 the signaling and associates the media stream with the session in the session control procedure. Based upon the session control procedure, the control entity sends 244 an instruction initiating or modifying transmission control of one or more subsequent elements of the stream elements in accordance with a control rule of the session.

Figure 7:
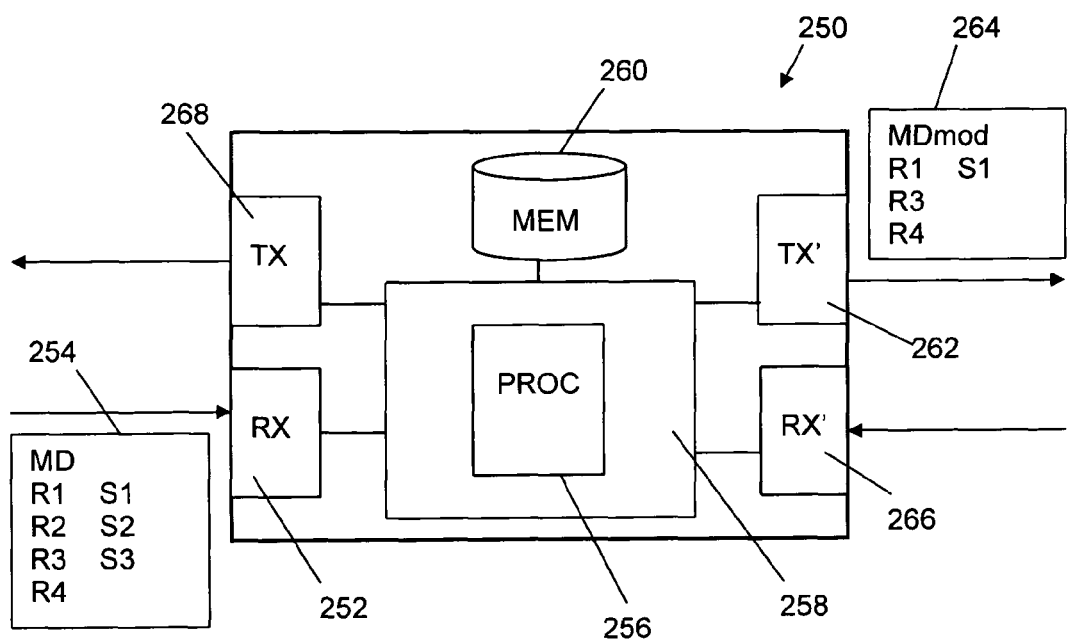
FIG. 7 shows a media proxy adapted to the proposed method.

A media proxy 250 for forwarding media descriptions from a server to a client is depicted in FIG. 7. Generally, the media proxy will forward also a plurality of other messages, requests and responses between the client and the server, e.g. the stream elements and requests for stream elements. The media proxy 250 comprises a receiver 252 for receiving, from the server, a media description 254 comprising a plurality of representation descriptions. Each representation description indicates a different representation of the media stream. In the example, the media description 254 comprises three descriptions of representations R1-R3 of the media stream with an associated source S1-S3 for each representation. It is also possible that the media description comprises descriptions of representations without a media source as indicated for representation description R4. In this case a client is informed about the existence of the representation but needs to perform further steps, e.g. association of the media stream with a session, before obtaining the source.

A processor 256 which may be part of a processing system 258 is adapted to modify the media description by removing or modifying at least one of the representation descriptions and/or an associated source from the media description 254. In the example, the description of representation R2 is removed together with the associated source S2, e.g. if a radio network to which the client is attached does not support the required data rate. For representation R3 only the source S3 is removed, e.g. if prior session setup is required for the media stream to ensure the necessary quality of service or if a billing shall be performed for the representation. The representation R1 with source S1 remains in the media description so that an initial source is available for the client, e.g. to allow initiating the playout using a best effort bearer. A memory 260 allows storing and retrieving data required for modifying the media description.

A sender 262 sends the modified media description 264 towards the client. Generally, a corresponding receiver 266 exists also for sender 262 and a sender 268 for receiver 252 to allow corresponding transmissions in the return direction. It is possible that the functions of both senders are performed by the same physical device; the same applies to both receivers.

The processing for modifying a media description as described for processor 256 can also be performed in other entities, e.g. in a media server.

A method in a media proxy for forwarding a media description from a server to a client comprises the step of receiving 280 the media description. The media description is received from the server and comprises a plurality of representation descriptions, each representation description indicating a different representation of the media stream. The media proxy modifies 282 the media description by removing or modifying at least one of the representation descriptions and a media source of the at least one representation description from the media description. Finally, the modified media description is sent 284 towards the client.

Any entity of the group comprising the media client, the media server, the control entity and the media proxy as well as the respective methods executed in the individual entities may be used in any embodiments of the method described and be accordingly adapted, i.e. implement those aspects of the method embodiments relating to the respective entity.

The proposed method can be used for example in IMS based QoS reservation for adaptive HTTP streaming. It specifies in this case a concept for integration of Adaptive HTTP streaming with SIP based control signaling with an IMS controlled infrastructure and allows and enables IMS specific features like QoS, billing, authentication etc. for Adaptive HTTP streaming. The proposed integration allows AHS backwards-compatibility to non-IMS capable devices, fast service startup, and service differentiation. The integration is based on the idea to include IMS control information, e.g., SIP URI (Uniform Resource Identifier), into the MPD.

Figure 8:
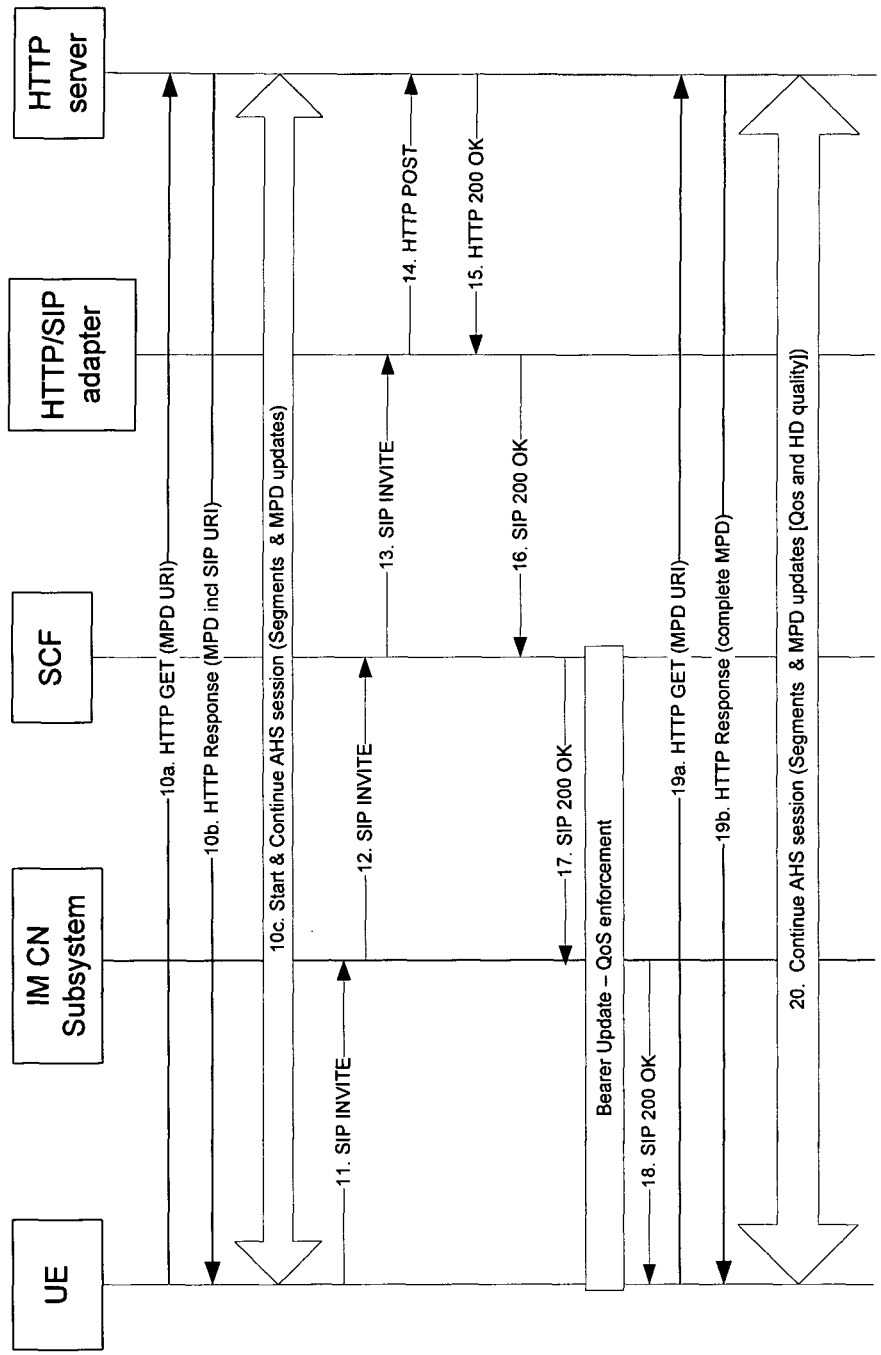
FIG. 8 shows a signaling diagram for an embodiment of the proposed method.

In the following a more detailed technical description of embodiments employing some of the above general concepts is made in the terms of IMS controlled AHS. It is assumed that the client has obtained the URL of the Media Presentation Description (MPD) file by any means, e.g., as link in an HTML page or in a message. FIG. 8 depicts the sequential interworking of affected entities, e.g. nodes.

Entities that are involved in the message flow are a User Equipment (UE), e.g., a mobile phone, as an example of a media client and an IP Multimedia Core Network Subsystem (IM CN Subsystem) which may be for example a core network of a mobile telephone system with a radio access network for allowing mobility of the UE. A Session Control Function (SCF) provides service logic and functions required to support execution of such logic, which may include for example service authorization during session initiation and session modification, checking user's service subscription in order to allow or deny access to a service or selections of media functions. The rules of such functions and their activation are subject to operator implementation. An HTTP/SIP adapter as an example of a control entity terminates the SIP signaling and communicates with an HTTP server which performs, as an example of a media server, the streaming of the media.

In many embodiments of the described procedures the IM CN Subsystem and the SCF can be standard IMS components and are then only affected by implementing rules and elements for controlling the media transmission. More than a single HTTP server may be used in the media streaming, e.g., when the MPD and the different media qualities are distributed via different servers. Furthermore, a Content Distribution Network (CDN) may be used instead of HTTP servers. The HTTP/SIP adapter and the HTTP server may be implemented as components on the same hardware or even within a single software. In this case, the interface between the two components may be different from the example shown in FIG. 8, i.e., not based on HTTP. The interface may instead, e.g., be based on API (Application Programming Interface) calls.

In the signal flow of FIG. 8, the UE performs an HTTP request 10a to the MPD URL, i.e., to the HTTP server that provides the MPD. The HTTP server responds with an MPD that contains the representation descriptions for all quality levels or, as an embodiment, only for the quality levels that are considered suitable for best effort transmission in the network. The returned MPD in the HTTP response 10b is accompanied by a SIP URI which enables SIP capable terminals to request a session setup for an AHS session. The SIP URI could be included for example as a standardized new MPD attribute, it may be packaged inside an existing MPD element or it could be part of the response 10b to the HTTP request, e.g. as part of a multipart response comprising a plurality of HTTP or other elements.

For these steps several options exist:
The request 10a may be proxied by an Application Layer Gateway (ALG) which may be located in the network, for example in the IM CN subsystem. The ALG is an example of a media proxy and may scan the requests for MPD files, remove representations and add a SIP URI to request QoS for the session.
Instead of including the SIP URI in the MPD, it may be included as a separate element and be transported in a multipart message of response 10b.
The response 10b including the MPD may also include additional information that the UE can utilize to generate an SDP file for the subsequent SIP INVITE message 1. This may, e.g., be additional information on the media which can be used to construct the SDP media part or an SDP template that the UE may use after completion of the variable parts of the template. In this way, the UE can either use stored information and routines to construct the SDP media part or receive the template for the request which comprises specific information elements which should be filled in like ports or media formats.
Instead of including the SIP URI in the MPD another type of URI (e.g. an HTTP URL) may be included which can be resolved to a SIP URI, e.g., by means of redirection.

In step 10c both IMS capable and non-IMS capable UEs initiate the AHS session. This allows a quick stream startup time and can be done using a best effort connection, e.g. on a default bearer to the IM CN Subsystem. In this way, also backward compatibility is possible wherein a non-IMS capable UE can ignore the SIP URI provided.

Devices that are IMS capable can in parallel to the AHS session startup send a SIP INVITE message 11-13 to the SIP/HTTP adapter. The INVITE is addressed to the previously communicated SIP URI. The INVITE message includes either no SDP, an SDP file generated by the client or the filled out SDP template that the client might have received with the MPD answer in response 10b.

If the SIP/HTTP adapter and the HTTP server are two separate entities, the SIP/HTTP adapter issues an HTTP request 14, e.g., a POST or GET request, to the HTTP server to obtain the URL to an original MPD and/or the original MPD itself which is returned in response 15. The term "original" indicates that this MPD can comprise an unfiltered list of the media representation descriptions available at the server while the MPD included in response 10b may have some of the representations removed. Due to the information in the original MPD, the SIP/HTTP adapter is able to issue a SIP 200 OK message 16 including an SDP that contains the information about the already ongoing AHS session of step 10c. The SIP 200 OK message is forwarded to the UE in steps 17 and 18. For example, in case the UE, i.e. client, shall get access to different media qualities, the SIP 200 OK message may contain an updated MPD URI which may comprise one or more additional media representations compared to the MPD included in response 10b. The updated MPD may either be the original MPD or a version edited, e.g. by the SIP/HTTP adapter or a proxy.

During the transmission of the data, the IM CN initiates enforcement of the specified policy, e.g. a QoS, for the media session, optionally including a bearer update. QoS reservation and policy enforcement may use the standard 3GPP mechanisms defined in 3GPP TS 23.203 titled Policy and charging control architecture. For example using the information from the MPD and the client IP address, ports, etc., corresponding Policy and Charging Control (PCC) rules may be created. The PCC rules allow policy enforcement points, such as gateways, to identify and prioritize packets belonging the HTTP streaming session. Packets exceeding bandwidth agreements may be marked to indicate congestion or may be dropped. PCC rules which consider other elements than IP addresses or ports, e.g. by relating to a service which may be identified by deep packet inspection at the policy enforcement points, allow also the usage of the described mechanism in case the HTTP Server is replaced by a cache or a CDN where the content can be streamed from multiple locations.

As a result of the policy enforcement and QoS provision for the media streaming session, the streaming client observes operation conditions of the network, e.g. an observed download speed, which is specific for the session. Accordingly, the client may adapt to the transmission conditions provided by the network using the existing AHS mechanisms of transmission monitoring without need for a corresponding signaling.

After the UE has received message 200 OK 18 and is aware of the established QoS, it may optionally check the HTTP server for an update of the MPD with HTTP request 19a and response 19b. The HTTP server may provide the update based on the information received in message 14 or by another confirmation of association of the media stream with the session. In case that response 10b did not include high quality media representations, the UE receives now an updated MPD with all representations according to the available QoS.

In step 20 the UE can adapt the requested media quality according to any newly available representations, e.g. higher quality levels, based on the adaptation algorithms in AHS. In this way the network operator may provide both service differentiation for different users and the required QoS for a specific media quality.

For non IMS capable devices step 20 is immediately executed after step 10c without update of the media quality.

Further optional functionality and embodiments of the procedures are possible:
In response 10b an indication of more available quality levels may be given, e.g., through a specific tag or trough the presence of more representations, including the bandwidth attribute, but without including <InitialisationSegmentURL> or <sourceURL> elements, i.e. media sources like links to media.
An SDP offer for the session can be generated by the UE or by the SIP/HTTP adapter. The required information is provided through the communication path and the MPD, e.g. sender and receiver IP address, media transport format and ports, and required bandwidth.
The removal of better quality representations from the MPD, e.g. by a server or proxy, in message 10b is optional. If no representations are removed, the proposed procedure allows service quality reservation. In the other case it allows service differentiation, e.g. for a client with an identification of a user that booked a certain package or that can obtain it via IMS provided billing.

The URIs that are provided in the MPD may be generated in a specific way, e.g. personalized for the user, that makes it difficult to guess the URIs for higher quality layers so that they can not easily be accessed without the information in the MPD.

In some cases a simple filter in the policy enforcement point based on IP-5-tuples, i.e. a filter allowing or restricting packets based on at least one element from a group comprising source address, source port, destination address, destination port and protocol identification, is not suitable for QoS enforcement, e.g., for streaming of content from a CDN. In such cases, the PCC rules may contain other information. For example, HTTP specific information such as headers may be included, that can be used during deep packet inspection in QoS enforcement points to identify packets from the HTTP streaming session.

The HTTP server may only grant access to a certain media quality, i.e., stream segments of a particular representation, after receiving an indication of the successful SIP INVITE procedure. There may be an additional communication between the HTTP server, the SIP/HTTP adapter and/or the IM CN to check this. For example, the SIP/HTTP adapter or the HTTP server might register the IP address of the UE during the SIP INVITE and check upon an HTTP GET request as in step 10 a 19a if the source IP of the GET request belongs to a registered UE.

Advantages depending on the particular embodiments may include the ability to benefit from the availability of resource reservation mechanisms and connect QoS reservation and control and AHS. Converged solutions can support both IMS and non IMS clients. Advantages of embodiments may also include Fast startup of streaming, even in case of delays for IMS QoS establishment Backwards-compatibility to existing and standardized AHS mechanisms Enablement of service differentiation by making better quality available when QoS via IMS is used Puts operator in control to decide, which quality levels should be available for best effort usage. This allows dynamic control of the network usage due to present conditions The above embodiments admirably achieve the objects of the invention. However, it will be appreciated that departures can be made by those skilled in the art without departing from the scope of the invention which is limited only by the claims.

The invention claimed is:

1. A method performed by a media client for controlling a transmission of a media stream having a plurality of consecutive stream elements, the method comprising:
obtaining, by a media client, a media description of the media stream, the media description indicating an initial consecutive stream element of the consecutive stream elements;
sending, from the media client, a request for the initial consecutive stream element;
initiating, by the media client towards a control entity for a session, a session control procedure, wherein the session control procedure performs an association that associates the media stream with the session, wherein the association specifies the session in which the media stream is transmitted;
during or after sending the request for the initial consecutive stream element, receiving, by the media client, a result of initiating the session control procedure; and
wherein a policy enforcement point controls a transmission of a subsequent consecutive stream element of the consecutive stream elements in accordance with a control rule of the session resulting from the session control procedure.

2. The method of claim 1, further comprising:
obtaining a resource locator indicating a source for session control associated with the media stream; and
sending a request for initiating the session control procedure with the source for session control.

3. The method of claim 2, wherein the resource locator is included in the media description or associated with the media description.

4. The method of claim 1, wherein the media description comprises or is associated with at least one information element for specifying a session parameter in the session control procedure.

5. The method of claim 1, wherein the session control procedure comprises:
receiving a session control response for the session control procedure by a client; and
sending, upon reception of the session control response, a request for the initial or the subsequent consecutive stream element of the consecutive stream elements.

6. The method of claim 5, wherein the session control response indicates at least one of:
a parameter specifying the session;
an indication of a media source; and
a media description.

7. The method of claim 6, wherein:
the session control procedure comprises a resource reservation; and
the parameter specifying the session indicates a granted quality of service.

8. The method of claim 6:
wherein a media source for the subsequent consecutive stream element is selected from a plurality of media sources;
wherein each media source from the plurality of media sources is associated with a different parameter specifying the session.

9. The method of claim 6, wherein the parameter specifying the session is included into the request for the subsequent consecutive stream element.

10. The method of claim 1:
wherein the media description comprises a plurality of representation descriptions, each representation description indicating a different representation of the media stream and an associated media source;
wherein at least one of the associated media sources is selected based on the media description and included into the request for the initial consecutive stream element or into the request for the subsequent consecutive stream element.

11. The method of claim 10, wherein the media description includes only a subset of representation descriptions suitable for best effort transmission, and wherein the method further comprises, after the session has already been initiated and via the session control procedure, the media client retrieving one or more additional representation descriptions not included within the media description and adapting a media quality of the media stream using the one or more additional representation descriptions.

12. The method of claim 1, wherein at least one of a media source and a source for session control is specific for the session.

13. The method of claim 1, wherein the request for the initial consecutive stream element is sent before or simultaneously with the initiation of the session control procedure.

14. The method of claim 1, wherein the session is an Adaptive HTTP Streaming (AHS) session and the session control procedure is a SIP-based procedure.

15. The method of claim 14, wherein the SIP-based procedure is a SIP INVITE procedure.

16. The method of claim 1, wherein the session is between the media client and an HTTP server, and the session control procedure is performed by the media client with an HTTP/SIP adapter.

17. The method of claim 1, wherein the session is an Adaptive HTTP Streaming (AHS) session between the media client and an HTTP server, and the session control procedure comprises the media client sending a SIP INVITE to an HTTP/SIP adapter after or in parallel to the media client initiating the AHS session.

18. The method of claim 1, wherein the session control procedure is at least one of a SIP based procedure and an IMS control procedure.

19. The method of claim 1, wherein the control rule of the session is associated with at least one of:
    providing a particular quality of service for the session;
    initiating a billing procedure; and
    blocking the session.

20. The method of claim 1, wherein the media description includes control information to allow the media client to request that the session control procedure be associated with the session in which the media stream is transmitted; and
    wherein said initiating includes sending a request, with the control information, to initiate the session control procedure.

21. A method in a media client for controlling a transmission of a media stream having a plurality of consecutive stream elements, the method comprising:
    obtaining, by the media client, a media description of the media stream, the media description indicating an initial consecutive stream element of the consecutive stream elements;
    sending, from the media client, a request for the initial consecutive stream element;
    initiating, by the media client towards a control entity for a session, a session control procedure, wherein the session control procedure performs an association that associates the media stream with the session, wherein the association specifies the session in which the media stream is transmitted;
    during or after sending the request for the initial consecutive stream element, receiving, by the media client, a result of initiating the session control procedure; and
    wherein a policy enforcement point controls a transmission of a subsequent consecutive stream element of the consecutive stream elements in accordance with a control rule of the session resulting from the session control procedure.

22. The method of claim 21, wherein the session control procedure is a SIP INVITE procedure and the result of the procedure is a SIP OK message.

23. A media client, comprising:
    a memory; and
    a controller operatively coupled to the memory, wherein the controller and the memory are configured to:
        obtain a media description of a media stream, the media description indicating an initial consecutive stream element of a plurality of consecutive stream elements;
        send a request for the initial consecutive stream element;
        initiate, towards a control entity for a session, a session control procedure, wherein the session control procedure performs an association that associates the media stream with the session, wherein the association specifies the session in which the media stream is transmitted;
        during or after sending the request for the initial consecutive stream element, receive a result of initiating the session control procedure; and
        wherein a policy enforcement point controls a transmission of a subsequent consecutive stream element of the consecutive stream elements in accordance with a control rule of the session resulting from the session control procedure.

24. A media server for controlling a transmission of a media stream having a plurality of consecutive stream elements in response to requests for the consecutive stream elements from a media client, the media server comprising:
    a memory; and
    a controller operatively coupled to the memory, wherein the controller and the memory are configured to:
        receive a request for an initial consecutive stream element of the plurality of consecutive stream elements, the request indicating the initial consecutive stream element;
        during or after receiving the request for the initial consecutive stream element, receive a result of a session control procedure for the transmission of the media stream, wherein the media client initiates, towards a control entity for a session, the session control procedure, wherein the session control procedure performs an association that associates the media stream with the session, wherein the association specifies the session in which the media stream is transmitted; and
        receive a further request for a subsequent consecutive stream element of the consecutive stream elements, wherein a policy enforcement point controls a transmission of the subsequent consecutive stream element of the consecutive stream elements in accordance with a control rule of the session resulting from the session control procedure.

25. The media server of claim 24, wherein the controller and the memory are further configured to send a media description of the media stream to the media client, the media description indicating a media source for the initial consecutive stream element of the consecutive stream elements.

26. The media server of claim 25, wherein the controller and the memory are further configured to:
    obtain an initial media description comprising a plurality of representation descriptions, each representation description indicating a different representation of the media stream; and
    remove or modify at least one of the representation descriptions and a media source of the at least one representation description to generate a modified media description.

27. A method in a media server controlling a transmission of a media stream having a plurality of consecutive stream elements in response to requests for the consecutive stream elements from a media client, the method comprising:
- receiving, by the media server, a request for an initial consecutive stream element of the consecutive stream elements, the request indicating the initial consecutive stream element;
- sending, from the media server, the indicated initial consecutive stream element;
- during or after receiving the request for the initial consecutive stream element, receiving, by the media server, a result of a session control procedure for the transmission of the media stream, wherein the media client initiates, towards a control entity for a session, the session control procedure, wherein the session control procedure performs an association that associates the media stream with the session, wherein the association specifies the session in which the media stream is transmitted; and
- receiving, by the media server, a further request for a subsequent consecutive stream element of the consecutive stream elements, wherein a policy enforcement point controls a transmission of the subsequent consecutive stream element of the consecutive stream elements in accordance with a control rule of the session resulting from the session control procedure.

28. A control entity for a session control procedure with a media client for a transmission of a media stream having a plurality of consecutive stream elements from a media server, the control entity comprising:
- a memory; and
- a controller operationally coupled to the memory, wherein the controller and the memory are configured to:
  - receive signalling of a session control procedure for the transmission of the media stream, wherein the media client initiates, towards the control entity for a session, the session control procedure, wherein the session control procedure performs an association that associates the media stream with the session, wherein the association specifies the session in which the media stream is transmitted;
  - terminate the signalling; and
  - send an instruction initiating control of a transmission of a subsequent consecutive stream element of the consecutive stream elements in accordance with a control rule of the session, wherein a policy enforcement point controls the transmission of the subsequent consecutive stream element of the consecutive stream elements in accordance with the control rule of the session resulting from the session control procedure.

29. A method in a control entity for performing a session control procedure with a media client for a transmission of a media stream having a plurality of consecutive stream elements from a media server, the method comprising:
- receiving, by the control entity, signalling of a session control procedure for the transmission of the media stream, wherein the media client initiates, towards the control entity for a session, the session control procedure, wherein the session control procedure performs an association that associates the media stream with the session, wherein the association specifies the session in which the media stream is transmitted;
- terminating, by the control entity, the signalling; and
- sending, from the control entity, an instruction initiating control of a transmission of a subsequent consecutive stream element of the consecutive stream elements in accordance with a control rule of the session, wherein a policy enforcement point controls the transmission of the subsequent consecutive stream element of the consecutive stream elements in accordance with the control rule of the session resulting from the session control procedure.

* * * * *

UNITED STATES PATENT AND TRADEMARK OFFICE
CERTIFICATE OF CORRECTION

PATENT NO. : 9,531,579 B2
APPLICATION NO. : 13/811334
DATED : December 27, 2016
INVENTOR(S) : Willig et al.

It is certified that error appears in the above-identified patent and that said Letters Patent is hereby corrected as shown below:

On the Title Page

In item (75), under "Inventors", in Column 1, Line 1, delete "Herzogenrath (DE);" and insert -- Bornheim (DE); --, therefor.

In item (57), under "ABSTRACT", in Column 2, Line 2, delete "element Is" and insert -- element is --, therefor.

In the Drawings

Figure 7A:
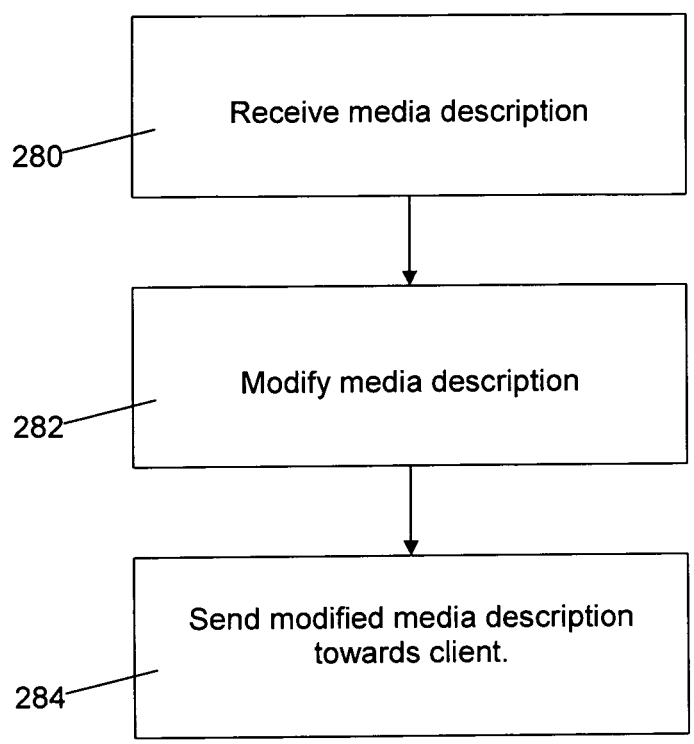
FIG. 7a shows a method executed in a media proxy.

In Fig. 7a, Sheet 10 of 11, for Tag "284", in Line 2, delete "client." and insert -- client --, therefor.

In the Specification

In Column 3, Line 3, delete "Smoothstreaming" and insert -- Smooth streaming --, therefor.

In Column 5, Line 12, delete "proxy;" and insert -- proxy; and --, therefor.

In Column 9, Line 30, delete "element 94" and insert -- stream element 94 --, therefor.

In Column 14, Line 56, delete "trough" and insert -- through --, therefor.

In Column 15, Line 49, delete "conditions" and insert -- conditions. --, therefor.

Signed and Sealed this
Fourteenth Day of March, 2017

Michelle K. Lee
*Director of the United States Patent and Trademark Office*